Jan. 11, 1927.  1,613,883
A. F. GILLET
WINDSHIELD WIPER
Filed Dec. 7, 1923
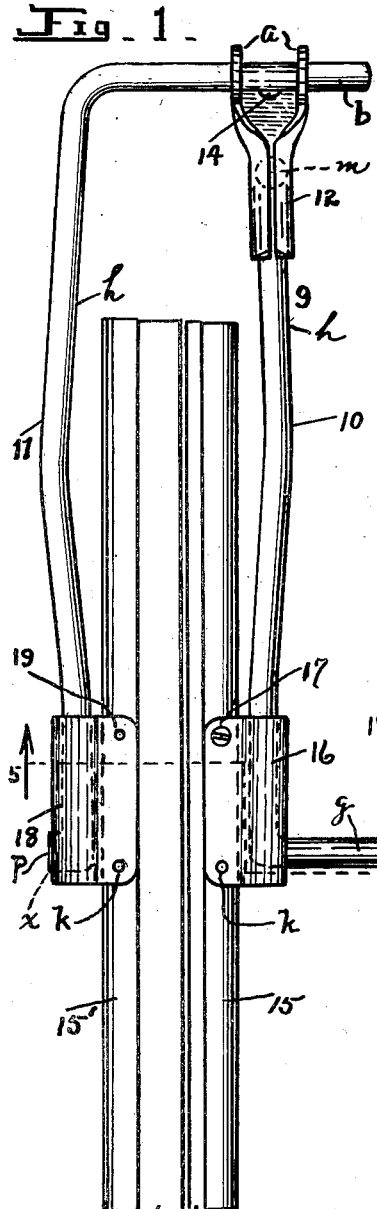
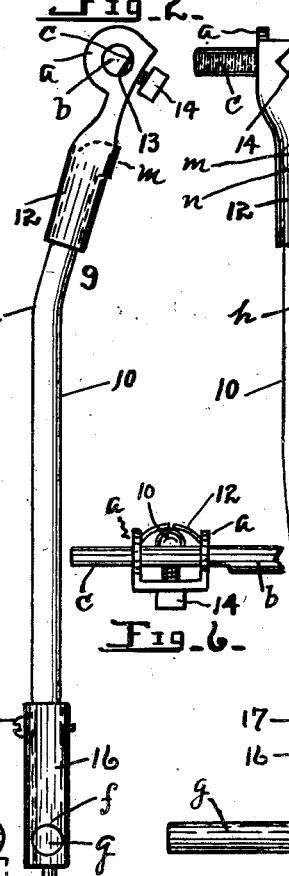
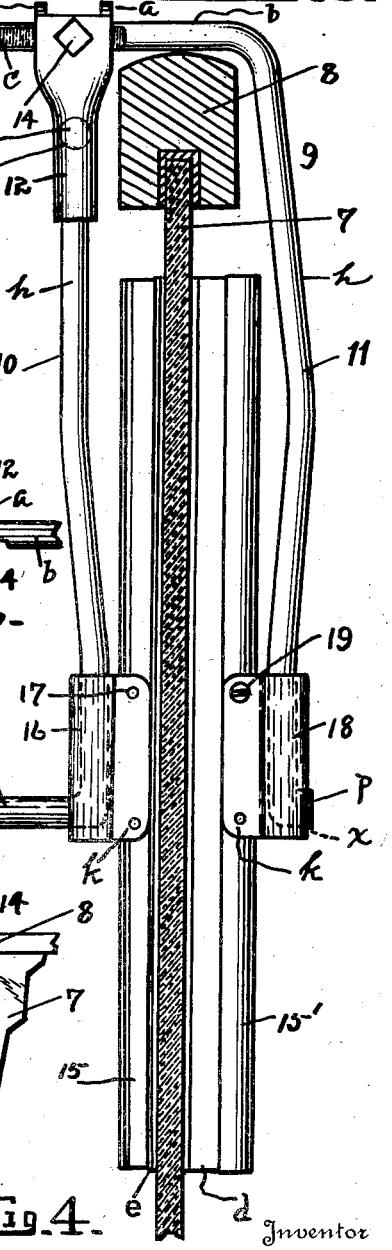
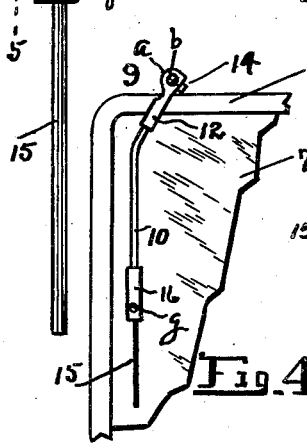
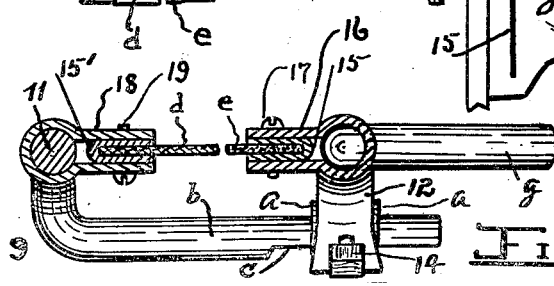
Inventor
Alexis F. Gillet,
By Hiram A. Sturges,
Attorney Patented Jan. 11, 1927.

1,613,883

UNITED STATES PATENT OFFICE.

ALEXIS F. GILLET, OF OMAHA, NEBRASKA, ASSIGNOR TO JUBILEE MANUFACTURING COMPANY, OF OMAHA, NEBRASKA, A CORPORATION.

WINDSHIELD WIPER.

Application filed December 7, 1923. Serial No. 679,180.

This invention has for its objects to provide such a construction for a windshield wiper that it may be manufactured practically and at less expense than ordinary, and which will be convenient in use and effective for removing dust or vapor from the surface of the glass. The invention includes certain adjustable features found to be of advantage in use.

In order that the foregoing objects may be attained, the wiper consists of few and simple parts which, for the most part, may be readily bent or pressed into certain required forms which, when assembled and arranged as will be described and used in combination, present a construction involving unusual novelty and utility.

The invention is illustrated by accompanying drawings, in which Fig. 1 is a front view of the windshield wiper. Fig. 2 is a side view of parts shown in Fig. 1. Fig. 3 is a rear view of the same, a part of a sash and glass of a windshield being added and in section. Fig. 4 shows a part of a windshield with the device mounted thereon. Fig. 5 is a transverse section on line 5—5 of Fig. 1, the view being on an enlarged scale. Fig. 6 illustrates means for a rigid connection of the two arms of a compression member, being a detail relating to Fig. 3.

Referring now to the drawing for a more particular description, the invention is shown and described in connection with the glass 7 and sash 8 of a windshield, and in order that the objects first mentioned may be attained, I provide a compression-member or frame 9 consisting of a pair of L-shaped arms 10 and 11, one end of the arm 10 being provided with a holder-bracket 12 having apertures 13 (Fig. 2) formed in its flanges $a$ adapted to receive the head-piece or projection $b$ of the arm 11, said projection $b$ being champed or pressed to provide a flat surface $c$ to be engaged by the end of a set-screw 14 which is threaded in said bracket, whereby a rigid connection for these arms is provided, and whereby adjustments may be made, the mounting for the arm 10 being at selected, longitudinal intervals of said projection $b$, this construction providing a compression-member or frame approximmately of inverted U-shape, its arms being adapted to be disposed at the respective sides of the sash and glass of a windshield, the projection $b$ being disposed outwardly of the sash, and when not in use to be supported by the sash.

Numerals 15 and 15' indicate a pair of channeled, elongated wiper-plates adapted to receive strips of suitable material, which are suitably secured therein for engaging the glass, one of these strips preferably being constructed of india rubber and indicated at $d$, and the other strip $e$ being constructed of felt.

Numeral 16 indicates a clasp approximately of U-shape in cross-section which is rigidly mounted on the arm 10 and having an aperture $f$ at or near the junction of its flanges (Fig. 2) for receiving the projection $g$ of said arm, its flanges having a pivotal connection 17 with said plate 15, and at 18 is indicated a similar clasp which is mounted rigidly on the arm 11, its flanges having a pivotal connection 19 with the wiper-plate 15'. By referring to Figs. 1 and 3 of the drawings it will be seen that the parts of the arms 10 and 11 received by the clasps, are rectilinear for suitable engagement with the clasps, the diameters of the curved parts of the clasps providing openings corresponding to the diameters of the rectilinear parts of said arms for a rigid, non-removable mounting of the clasps thereon, the diameters of these parts of the arms, as shown in Fig. 5, being greater than the distance apart of the flanges of the clasps.

Since the pivotal mounting for each wiper-plate 15 and 15' is between its ends, they may have limited swinging movements toward the glass to conform to the surfaces of said glass, which facilitates wiping and cleaning, said strips $d$ and $e$ being pressed with practically the same degree of force against the opposed sides of the glass by operation of the compression-member or frame 9, the adjustable connection provided by the set-screw, in effect, forming a spring having the same resiliency, substantially, as would be provided if it was an integral structure.

To dispose the device in operative position, disconnection of the arms 10 and 11 is necessary. After the set-screw has been removed, the arms 10 and 11 may be placed (together with parts mounted thereon) at opposed sides of the glass, the projection $b$ of the arm 11 being disposed outwardly of the sash. The arm 10 is then mounted on the projection $b$ of arm 11 and is adjusted longitudinally thereof so that the strips $d$ and $e$ will suitably engage the glass, said adjustment depending, of course, upon the thickness of the glass, and by means of the set-screw a rigid connection is made for these parts, the set-screw having a flat terminal, best shown in Fig. 6, adapted to engage the flat surface $c$ of the projection $b$ of said arm 11 which effectively prevents any swinging movements of the arms relative to each other except movements permitted by their elastic action; and by the use of handle $g$, the device may be moved in a straight line or may have swinging movements, the strips $d$ and $e$ being pressed into engagement with the glass, as shown in Fig. 3, the principal function discharged by said projection $g$ being to provide a handle for manual use when wiping.

It will be noted that the arms 10 and 11 are bent, as indicated at $h$, near their connected ends at an obtuse angle to dispose the wiping-plates in a plane adjacent to the plane of the projection or head-piece $b$, this being of advantage to permit the device, when not in use, to be disposed at one end of a windshield so that it will not be obtrusive and will not unduly obstruct the view of a driver, and also to facilitate wiping all of that part of the glass adjacent to the end of a windshield near the driver.

As best shown in Figs. 1 and 3, apertures $k$ are provided to permit the wiper-plates 15 and 15' to be adjusted longitudinally, the keepers or pivots 17 and 19 being removed, and thereafter placed in the apertures $k$ which permits wiping of parts of the glass remote from the sash.

By referring to the drawings it will be seen that no keepers or rivets are required for securing the clasps 16 and 18 to the arms 10 and 11, nor for securing the holder-bracket 12 to the arm 10 since the handle or projection $g$ of arm 10 engages in the aperture $f$ of the clasp 16 (Fig. 2), the opposite end of said arm 10 having an upset part or terminal $m$ engaging in an aperture $n$ (Fig. 3) of the bracket 12, the arm 11 having an upset terminal part $p$ engaging in an aperture $x$ provided for the clasp 18, the end of said part, $p$ being unobtrusive since it terminates in the plane of said clasp 18, these features tending to materially reduce the cost of manufacture. Also since the flanges $a$ of the bracket 12 are disposed in spaced relation any transverse movement of the projection $b$ in aperture 13 is prevented. Also any rotation of the bracket 12 on the arm 10 will be prevented since the upset terminal $m$ engages in the aperture $n$ of said bracket.

I claim as my invention,—

1. In a windshield wiper, a pair of wiper-plates, a pair of clasps approximately of U-shape in cross-section each having approximately parallel flanges mounting therebetween a wiper-plate and having an aperture near one of its ends at the junction of its flanges, and a compression-frame approximately of inverted U-shape providing a pair of arms, each having a rectinlinear portion disposed in one of said clasps and having a projection engaging in the aperture of said clasp, the diameters of the curved parts of the clasps providing openings corresponding to the diameters of the rectilinear parts of said arms for a non-revoluble mounting of the clasps thereon.

2. In a windshield wiper, a pair of wiper-plates, a pair of clasps approximately of U-shape in cross-section each having approximately parallel flanges mounting therebetween a wiper-plate and having an aperture at the junction of its flanges, and a compression-frame approximately of inverted U-shape providing a pair of arms, each having a rectilinear portion disposed in one of said clasps and having a projection engaging in the aperture of said clasp, the diameters of the curved parts of the clasps being greater than the distance apart of the flanges and conforming approximately to the diameters of the rectilinear parts of said arms to prevent a rotatable movement of the clasps relative to said arms, the projection of one of said arms extending outwardly from a clasp to provide a handle.

In testimony whereof, I have affixed my signature.

ALEXIS F. GILLET.